(12) United States Patent
Matsumoto et al.

(10) Patent No.: US 11,703,843 B2
(45) Date of Patent: Jul. 18, 2023

(54) CONTROL APPARATUS AND NON-TRANSITORY PROGRAM RECORDING MEDIUM PERFORMING REPEATED DETERIORATION DIAGNOSTIC AT A PREDETERMINED TIMING

(71) Applicant: FANUC CORPORATION, Yamanashi (JP)

(72) Inventors: Satoshi Matsumoto, Yamanashi (JP); Yoshikiyo Tanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 178 days.

(21) Appl. No.: 17/108,126

(22) Filed: Dec. 1, 2020

(65) Prior Publication Data

US 2021/0191377 A1 Jun. 24, 2021

(30) Foreign Application Priority Data

Dec. 24, 2019 (JP) ................................ 2019-233199

(51) Int. Cl.
G05B 23/02 (2006.01)

(52) U.S. Cl.
CPC ....... *G05B 23/0208* (2013.01); *G05B 23/027* (2013.01); *G05B 23/0262* (2013.01); *G05B 2219/31366* (2013.01)

(58) Field of Classification Search
CPC ............ G05B 23/0208; G05B 23/0262; G05B 23/027; G05B 2219/31366; G05B 23/0272; G05B 23/0283; G05B 19/048
See application file for complete search history.

(56) References Cited

U.S. PATENT DOCUMENTS

| 2006/0073822 | A1* | 4/2006 | Orton | H04L 41/0627 340/506 |
| 2013/0268241 | A1* | 10/2013 | Das | G06F 11/00 702/185 |
| 2014/0176152 | A1* | 6/2014 | Wolbank | G01R 31/1227 324/510 |
| 2017/0053528 | A1* | 2/2017 | Van Camp | G08B 29/185 |
| 2018/0149516 | A1* | 5/2018 | Wascat | G01H 1/00 |
| 2019/0346822 | A1* | 11/2019 | Jalluri | G01M 13/00 |

FOREIGN PATENT DOCUMENTS

JP 2009-125917 A 6/2009

\* cited by examiner

*Primary Examiner* — Kenneth M Lo
*Assistant Examiner* — Jonathan Michael Skrzycki
(74) *Attorney, Agent, or Firm* — Studebaker & Brackett PC

(57) ABSTRACT

A control apparatus for controlling an industrial machine includes a deterioration diagnostic unit that has a diagnostic function, which is repeatedly executed at predetermined timing, for diagnosing deterioration of each component of the industrial machine and outputs an alarm signal in response to deterioration equal to or more than a predetermined level in each component, an alarm control unit that outputs a stop command to the industrial machine based on the alarm signal and informs that the industrial machine is in an alarm stop state, and a cancellation operation receiving unit that receives the cancellation operation for cancelling the alarm stop state regardless of deterioration of each component. The deterioration diagnostic unit cancels the alarm stop state brought on by the diagnostic function based on the cancellation operation, and allows the industrial machine to operate until the diagnostic function is executed next.

7 Claims, 9 Drawing Sheets

CONTROL APPARATUS AND NON-TRANSITORY PROGRAM RECORDING MEDIUM PERFORMING REPEATED DETERIORATION DIAGNOSTIC AT A PREDETERMINED TIMING

This application based on and claims the benefit of priority from Japanese Patent Application 2019-233199, filed on 24 Dec. 2019, the content of which is incorporated herein by reference.

BACKGROUND OF THE INVENTION

Field of the Invention

The present disclosure relates to a control apparatus and a non-transitory program recording medium.

Related Art

Typically, a production line on which a plurality of industrial machines is arranged has been known. For example, a product assembly line on which a plurality of delivery machines is arranged has been known. Various sensors are provided for the industrial machines, and an operation status of each component of the industrial machines can be acquired. A control apparatus that controls the industrial machine monitors the acquired operation state so that the state of the industrial machine can be diagnosed.

In some cases, each component of the industrial machine may experience a decline in performance due to deterioration. In a case where the control apparatus detects the decline in performance of each component, the control apparatus outputs an alert (warning) to notify the outside of such decline in performance. As described above, the apparatus capable of monitoring the operation state of the apparatus to issue the alert has been proposed (see, e.g., Japanese Unexamined Patent Application, Publication No. 2009-125917).

Patent Document 1: Japanese Unexamined Patent Application, Publication No. 2009-125917

SUMMARY OF THE INVENTION

In the apparatus described in Japanese Unexamined Patent Application, Publication No. 2009-125917, e.g., deterioration of a servo amplifier is diagnosed, and in this manner, determination of whether or not failure can possibly occur is made. In a case where it is determined that the failure can possibly occur, the alert is issued so that an operator can be alerted. Such a situation is not failure, and for this reason, operation of the servo amplifier is allowed. With this configuration, stopping of a production line can be avoided.

There is a possibility that just by issuing the alert as in Japanese Unexamined Patent Application, Publication No. 2009-125917, the alert may be left unnoticed by the operator. It is assumed that in a case where an alerted state is left and operation is continued, the operating production line is stopped due to damage of the deteriorated component. For this reason, it is preferable to be able to more clearly show to the operator the necessity of replacing the deteriorated component while the industrial machine can be continuously operating. The mission of the industrial machine is to improve an operation rate, and stopping during an operation period is not preferable because the operation rate of the industrial machine is decreased. During a stop period in which the industrial machine is not in operation, a regular maintenance/replacement work is performed. For this reason, it is advantageous that replacement of the deteriorated component is performed at this timing. Normally, even when a deterioratable component that can be regularly replaced is in a deteriorated state, the deteriorated component does not fail immediately, and the deteriorated component can operate for a certain period. Thus, a method in which the deteriorated component is operated for the certain period after deterioration is detected and is replaced during the stop period in which the industrial machine is not in operation is a method with the least decrease in operation rate. Thus, provision of a mechanism for causing the operator to reliably recognize the deteriorated state of the deterioratable component without decreasing the operation rate of the industrial machine is important.

(1) The present disclosure relates to a control apparatus for controlling an industrial machine including a deterioration diagnostic unit that has a diagnostic function, which is repeatedly executed at predetermined timing, for diagnosing deterioration of each component of the industrial machine and outputs an alarm signal in response to deterioration equal to or more than a predetermined level in each component, an alarm control unit that outputs a stop command to the industrial machine based on the alarm signal and informs that the industrial machine is in an alarm stop state, and a cancellation operation receiving unit that receives the cancellation operation for cancelling the alarm stop state. The deterioration diagnostic unit cancels the alarm stop state brought on by the diagnostic function based on the cancellation operation, and allows the industrial machine to operate until the diagnostic function is executed next.

(2) Moreover, the present disclosure relates to a non-transitory program recording medium causing a computer to function as a control apparatus having an automatic diagnostic function for an industrial machine. The program causes a computer to function as a deterioration diagnostic unit that has a diagnostic function, which is repeatedly executed at predetermined timing, for diagnosing deterioration of each component of the industrial machine and outputs an alarm signal in response to deterioration equal to or more than a predetermined level in each component, an alarm control unit that outputs a stop command to the industrial machine based on the alarm signal and informs that the industrial machine is in an alarm stop state, and a cancellation execution unit that executes cancellation based on the cancellation operation for cancelling the alarm stop state. The deterioration diagnostic unit cancels the alarm stop state brought on the diagnostic function based on the cancellation operation, and allows the industrial machine to operate until the diagnostic function is executed next.

According to the present disclosure, the control apparatus and the non-transitory program recording medium are provided so that the necessity of replacing the deteriorated component can be more clearly shown to an operator while the industrial machine is continuously operating.

DETAILED DESCRIPTION OF THE INVENTION

Figure 1:
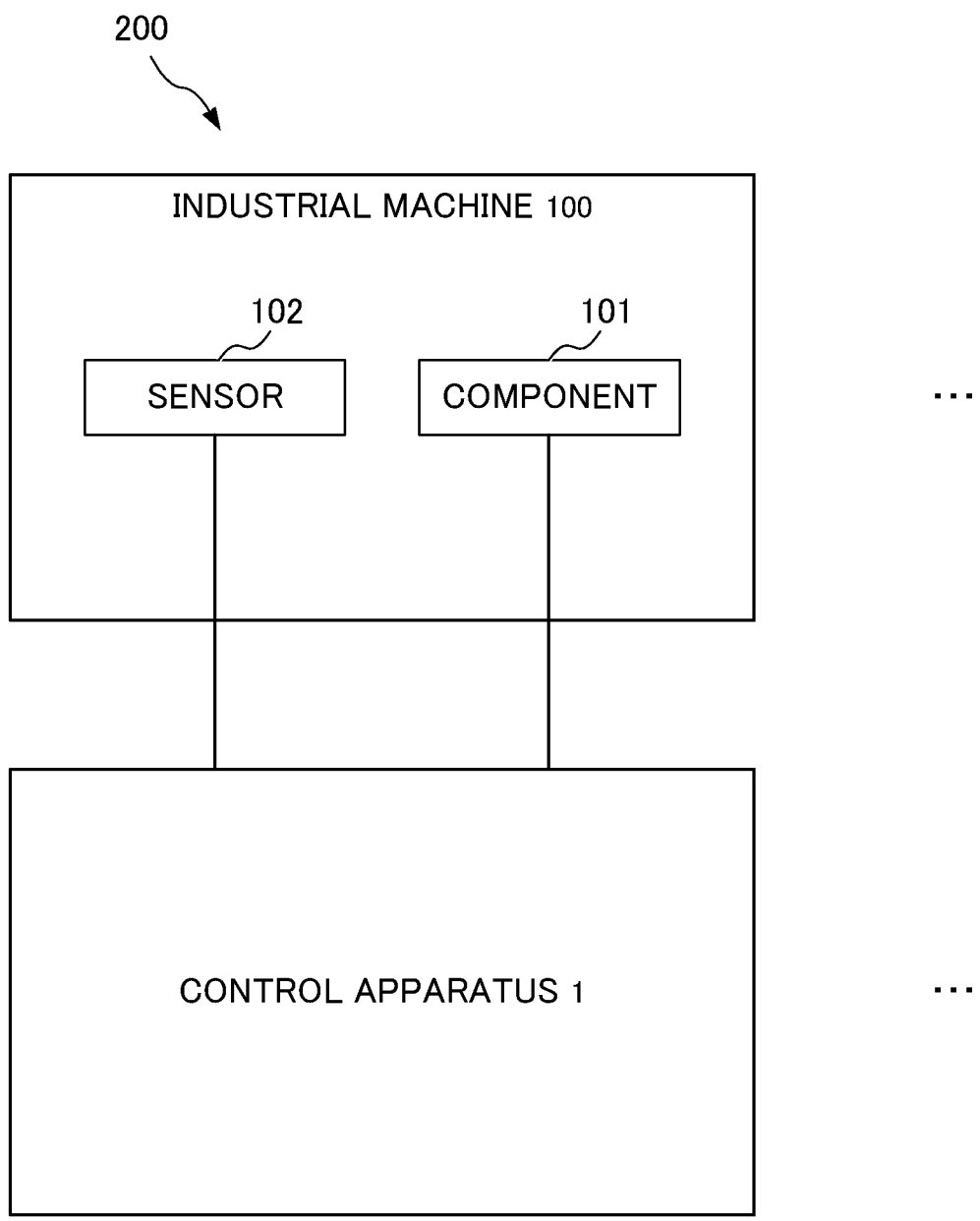
FIG. 1 is a schematic configuration diagram showing a production line including a control apparatus according to a first embodiment of the present disclosure.
Figure 2:
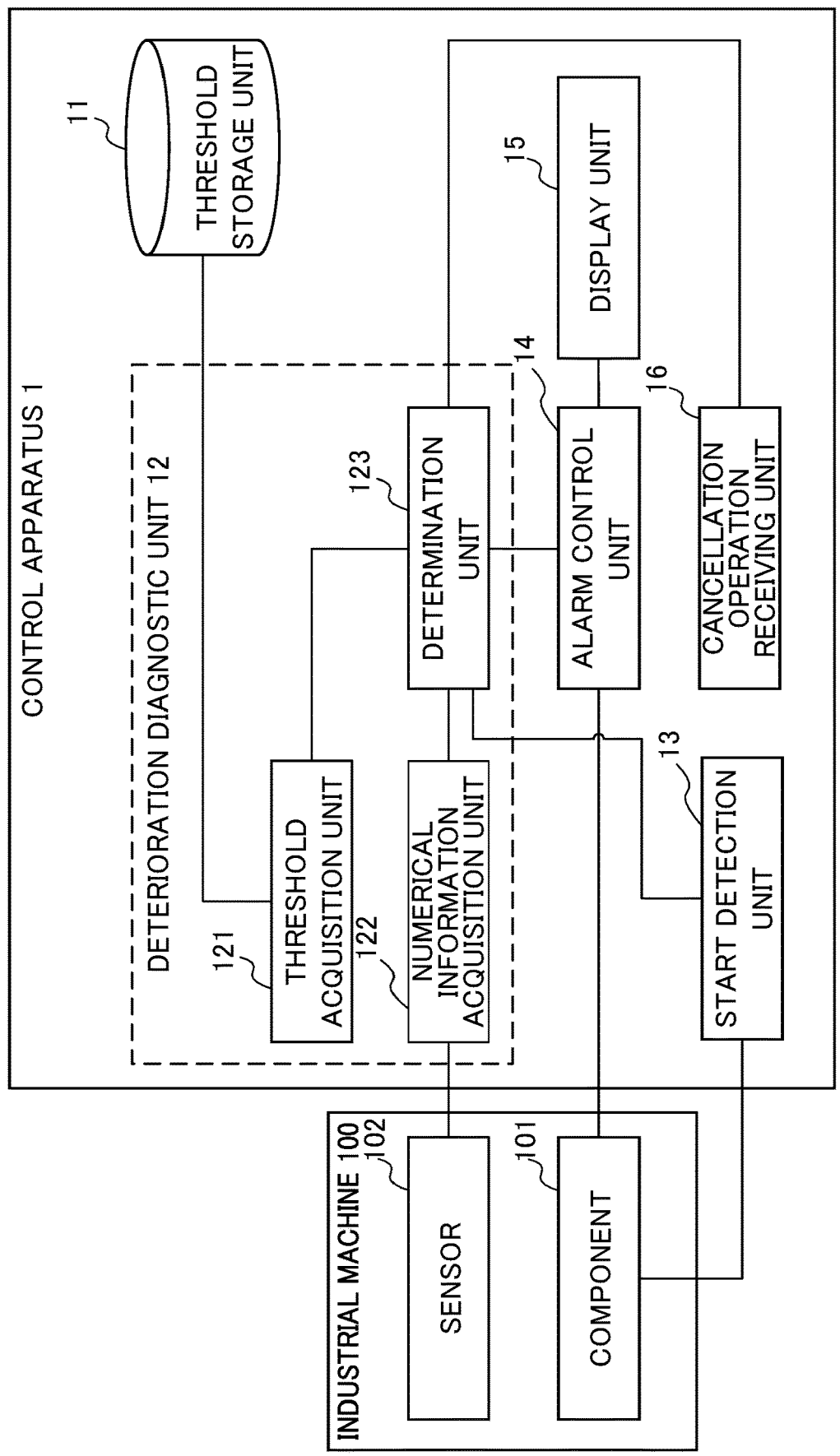
FIG. 2 is a block diagram showing a configuration of the control apparatus of the first embodiment.

Hereinafter, a control apparatus 1 and a program according to each embodiment of the present disclosure will be described with reference to FIGS. 1 to 9. First, the summary of control by the control apparatus 1 will be described. As shown in FIG. 1, the control apparatus 1 is, for example, connected to each of a plurality of industrial machines 100 arranged on a production line 200. The control apparatus 1 controls operation of the connected industrial machine 100. The control apparatus 1 controls operation of each component 101 of the industrial machine 100 so that the production line 200 can operate.

Further, the control apparatus 1 also has an automatic diagnostic function for the connected industrial machine 100. Specifically, the control apparatus 1 diagnoses deterioration of each component 101 of the industrial machine 100 so that deterioration equal to or more than a predetermined level (arrival of replacement time) can be notified to an operator of the industrial machine 100. For example, the control apparatus 1 diagnoses deterioration of the component 101 by means of an output signal from a sensor 102 that detects the state of the component 101. Moreover, the control apparatus 1 can notify, via screen display, the operator of the industrial machine 100 of the deterioration equal to or more than a predetermined level, for example. Note that, e.g., a limited-life component, a consumable component, or a deterioratable component is a diagnostic target as the component 101. The limited-life component is a cooling fan, for example. The consumable component is a battery, for example. The deterioratable component is an insulating component, for example. For the industrial machine 100, deterioration is diagnosed in warming-up operation after power-on or during inspection before start. Note that in automatic diagnosis, even a state with no problem in operating is diagnosed as a deteriorated state so that replacement can be encouraged before a failed state. Thus, even after the component 101 has been diagnosed as the deteriorated state, the industrial machine 100 can operate for a certain period.

In each embodiment below, the control apparatus 1 can bring the industrial machine 100 into an alarm stop (trip) state when deterioration equal to or more than a predetermined level is detected. Moreover, the control apparatus 1 cancels the alarm stop state according to predetermined operation so that the industrial machine 100 can continuously operate. Further, in each embodiment below, the control apparatus 1 diagnoses deterioration of the component 101 at the timing of powering on the industrial machine 100, and brings the industrial machine 100 into the alarm stop state. Note that in each embodiment below, an "alarm signal" is a signal indicating that the deterioration equal to or more than a predetermined level (exceeding a predetermined threshold value) has been detected in each component 101. Moreover, the "alarm stop state" is a state in which the industrial machine 100 is stopped in a case where deterioration exceeding the predetermined threshold value has been detected in the component 101. Further, in each embodiment below, "cancellation operation" is the operation for cancelling the "alarm stop state" in a case where each component 101 has been diagnosed as being deteriorated.

First Embodiment

Hereinafter, a control apparatus 1 and a program according to a first embodiment of the present disclosure will be described with reference to FIGS. 1 to 6. The control apparatus 1 according to the present embodiment includes a threshold storage unit 11, a deterioration diagnostic unit 12, a start detection unit 13, an alarm control unit 14, a display unit 15, and a cancellation operation receiving unit 16.

The threshold storage unit 11 is, for example, a non-volatile secondary storage medium such as a hard disk. The threshold storage unit 11 stores, for a quantified operation state of each component 101 of an industrial machine 100, a numerical threshold value determined as deterioration.

The deterioration diagnostic unit 12 is, for example, implemented by operation of a central processing unit (CPU). The deterioration diagnostic unit 12 has a diagnostic function that diagnoses deterioration of each component 101 of the industrial machine 100, the diagnostic function being repeatedly executed at predetermined timing. Moreover, the deterioration diagnostic unit 12 outputs an alarm signal in response to a deterioration equal to or more than a predetermined level in each component 101. In the present embodiment, the deterioration diagnostic unit 12 repeated diagnoses deterioration of each component 101 at each timing of powering on the industrial machine 100. The deterioration diagnostic unit 12 includes a numerical information acquisition unit 122, a threshold acquisition unit 121, and a determination unit 123.

The numerical information acquisition unit 122 acquires an operation state of each component 101 as numerical information. The numerical information acquisition unit 122 is, for example, connected to a sensor 102 that measures the state of each component 101 of the industrial machine 100. The numerical information acquisition unit 122 acquires, as the numerical information, the operation state of each component 101 outputted from the sensor 102.

The threshold acquisition unit 121 is connected to the threshold storage unit 11. The threshold acquisition unit 121 acquires a threshold value for each component 101, the threshold value being stored in the threshold storage unit 11. The threshold acquisition unit 121 acquires, for the acquired numerical information on each component 101, a threshold value indicating deterioration, for example.

The determination unit 123 determines deterioration of each component 101 based on the numerical information and the threshold value. The determination unit 123 compares the numerical information and the threshold value, for example. As a result of the comparison, the determination unit 123 determines, with reference to the threshold value, a numerical information decrease or excess to a side determined as a deteriorated state, thereby determining deterioration of each component 101. For example, in a case where the number of rotations per unit time of a fan (not shown) as the component 101 becomes lower than the threshold value, the determination unit 123 determines that the fan is in the deteriorated state. Moreover, in a case where the voltage of a battery (not shown) as the component 101 becomes lower than the threshold value, the determination unit 123 determines that the battery is in the deteriorated state, for example. Further, in a case where insulating performance of an insulating component (not shown) as the component 101 becomes lower than the threshold value, the determination unit 123 determines that the insulating component is in the deteriorated state, for example.

Based on cancellation operation received by the later-described cancellation operation receiving unit 16, the determination unit 123 cancels an alarm stop state of the industrial machine 100. The determination unit 123 functions as a "cancellation execution unit that executes cancellation based on the cancellation operation for cancelling the alarm stop state". For example, the determination unit 123 identifies a match between the received cancellation operation and a preset cancellation code, thereby switching the industrial machine 100 from the alarm stop state to an operable state. At this point, the determination unit 123 temporarily saves a diagnostic result in an internal memory (not shown). The determination unit 123 outputs the alarm signal reflecting the diagnostic result saved in the internal memory. The determination unit 123 rewrites an alarm state saved in the internal memory based on the cancellation operation into a non-alarm state, thereby stopping the output of the alarm signal. With this configuration, the determination unit 123 can switch the industrial machine 100 from the alarm stop state to the operable state. The determination unit 123 outputs, for example, the alarm signal including information on the component 101 in the deteriorated state. In the present embodiment, the determination unit 123 allows the industrial machine 100 to operate until the next diagnostic function is executed after the alarm stop state has been cancelled.

The start detection unit 13 is, for example, implemented by the operation of the CPU. The start detection unit 13 detects the start of the industrial machine 100. The start detection unit 13 detects, for example, power-on of the industrial machine 100. The start detection unit 13 detects operation of the component 101 (e.g., a power button (not shown)), thereby detecting the power-on of the industrial machine 100. Moreover, the start detection unit 13 outputs, as a detection signal, the detected power-on of the industrial machine 100 to the determination unit 123. The start detection unit 13 may be implemented by an initialization program of the CPU for controlling the industrial machine 100, and may execute the diagnostic function during initialization of the industrial machine 100 right after the power-on.

The alarm control unit 14 is, for example, implemented by the operation of the CPU. The alarm control unit 14 outputs a stop command to the industrial machine 100 based on the alarm signal. Moreover, the alarm control unit 14 informs that the industrial machine 100 is in the alarm stop state. Specifically, the alarm control unit 14 outputs the alarm signal in response to the deterioration equal to or more than a predetermined level in each component 101, and brings the industrial machine 100 into the alarm stop state. For example, the alarm control unit 14 performs alarm stop control for each component 101, thereby stopping the industrial machine 100.

The display unit 15 is, for example, a display apparatus such as a display. The display unit 15 displays an alarm based on the signal outputted from the alarm control unit 14. For example, the display unit 15 displays, as the alarm, the information on the component 101 in the deteriorated state.

The cancellation operation receiving unit 16 is, for example, implemented by the operation of the CPU. The cancellation operation receiving unit 16 receives, for example, the input of the cancellation operation to an input unit (not shown) such as a keyboard or a mouse. The cancellation operation receiving unit 16 receives the cancellation operation for cancelling the alarm stop state.

Figure 3:
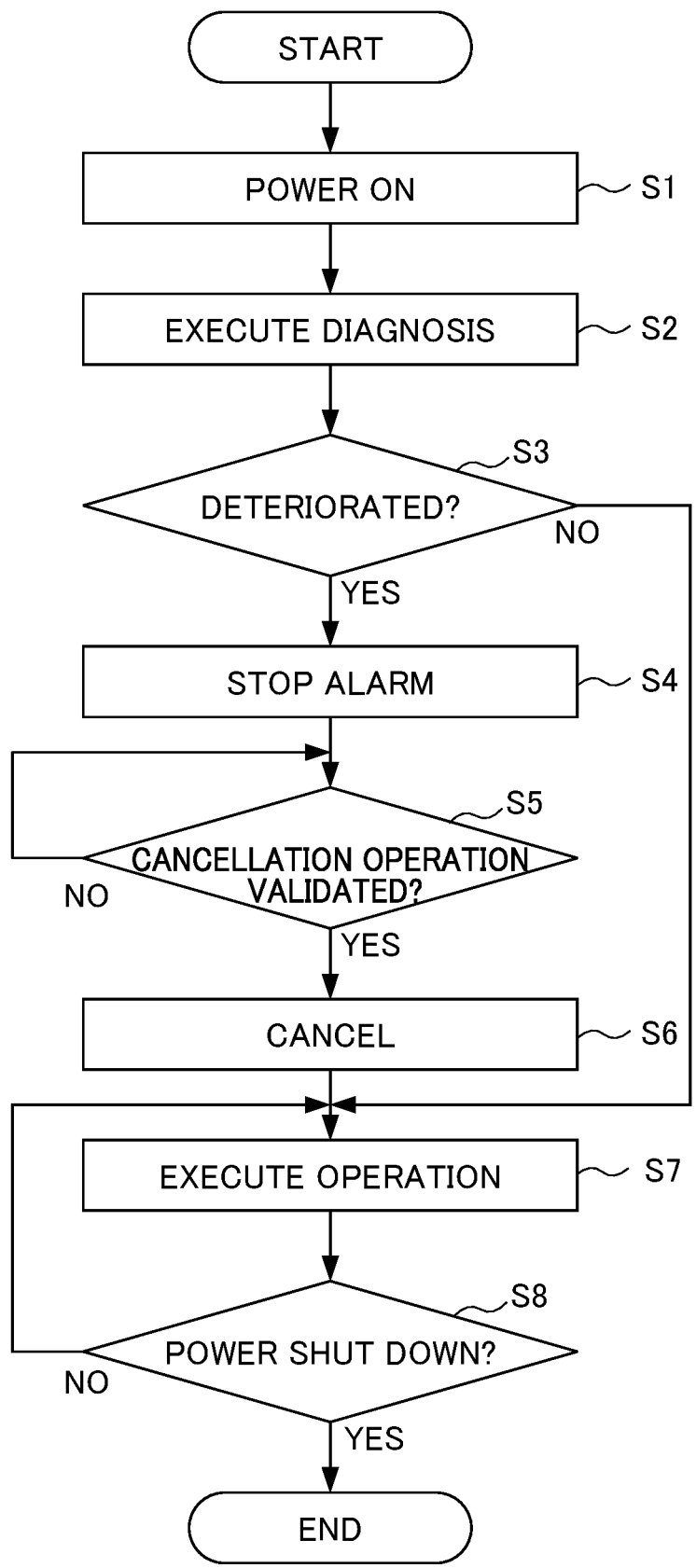
FIG. 3 is a flowchart showing operation of the control apparatus of the first embodiment.

Next, operation of the control apparatus 1 will be described with reference to a flowchart of FIG. 3. First, the industrial machine 100 is powered on (Step S1). Subsequently, diagnosis of the industrial machine 100 by the deterioration diagnostic unit 12 is executed (Step S2).

Subsequently, deterioration of the industrial machine 100 is determined (Step S3). The numerical information acquisition unit 122 acquires the numerical information indicating the operation state of each component 101 of the industrial machine 100. Moreover, the threshold acquisition unit 121 reads, from the threshold storage unit 11, the threshold value set in advance for each component 101. The determination unit 123 determines deterioration of each component 101 used on the numerical information and the threshold value. In a case where it is determined that the component 101 is in the deteriorated state (Step S3: YES), the process proceeds to Step S4. On the other hand, in a case where it is determined that the component 101 is not in the deteriorated state (Step S3: NO), the process proceeds to Step S7.

At Step S4, the alarm control unit 14 outputs the stop command to the industrial machine 100. In this manner, the alarm control unit 14 alarm-stops (trips) the industrial machine 100. Moreover, the alarm control unit 14 outputs, to the display unit 15, the signal indicating the component 101 in the deteriorated state. The display unit 15 executes displaying based on the signal.

Subsequently, the deterioration diagnostic unit 12 (the determination unit 123) determines the presence or absence of reception of the preset cancellation operation for cancelling the alarm stop state (Step S5). For example, for the cancellation operation received by the cancellation operation receiving unit 16, the deterioration diagnostic unit 12 determines whether or not the cancellation operation matches with the preset cancellation code. In this manner, the deterioration diagnostic unit 12 determines the presence or absence of reception of the preset cancellation operation. In a case where the preset cancellation operation has been received (Step S5: YES), the process proceeds to Step S6. On the other hand, in a case where the preset cancellation operation has not been received (Step S5: NO), the process repeats Step S5.

At Step S6, the alarm control unit 14 cancels the alarm stop state of the industrial machine 100. For example, the alarm control unit 14 returns operation of the industrial machine 100 to a normal state, thereby cancelling the alarm stop state of the industrial machine 100. Moreover, the alarm control unit 14 displays, for example, an indication of cancellation of the alarm stop state on the display unit 15.

Subsequently, the operation of the industrial machine 100 is executed (Step S7). The control apparatus 1 operates the industrial machine 100 based on a preset operation program, for example.

Subsequently, power shutdown is determined (Step S8). For example, the alarm control unit 14 determines the presence or absence of shutdown of the power of the industrial machine 100. In a case where the power shut down, the process according to the present flow ends. On the other hand, in a case where the power not shut down, the process returns to Step S7.

Next, the program will be described. Each configuration included in the control apparatus 1 can be implemented by hardware, software, or a combination thereof. Implementation by the software as described herein means implementation by reading and executing a program by a computer.

The program can be stored and supplied to the computer using various types of non-transitory computer readable media. The non-transitory computer readable media include various types of tangible storage media. Examples of the non-transitory computer readable media include magnetic recording media (e.g., a flexible disk, a magnetic tape, and a hard disk drive), magnetic optical recording media (e.g., a magnetic optical disk), a CD read only memory (CD-ROM), a CD-R, a CD-R/W, and semiconductor memories (e.g., a mask ROM, a programmable ROM (PROM), an erasable PROM (EPROM), a flash ROM, and a random access memory (RAM)). A display program may be supplied to the computer via various types of transitory computer readable media. Examples of the transitory computer readable media include an electric signal, an optical signal, and an electromagnetic wave. The transitory computer readable medium can supply the program to the computer via a wired communication path such as an electric wire or an optical fiber or via a wireless communication path.

Next, diagnosis in the control apparatus 1 according to the present embodiment and alarm stop timing will be described. A case where the control apparatus 1 diagnoses each of the fan, the battery, and the insulating component will be described.

(Number of Rotations of Fan)

Figure 4:
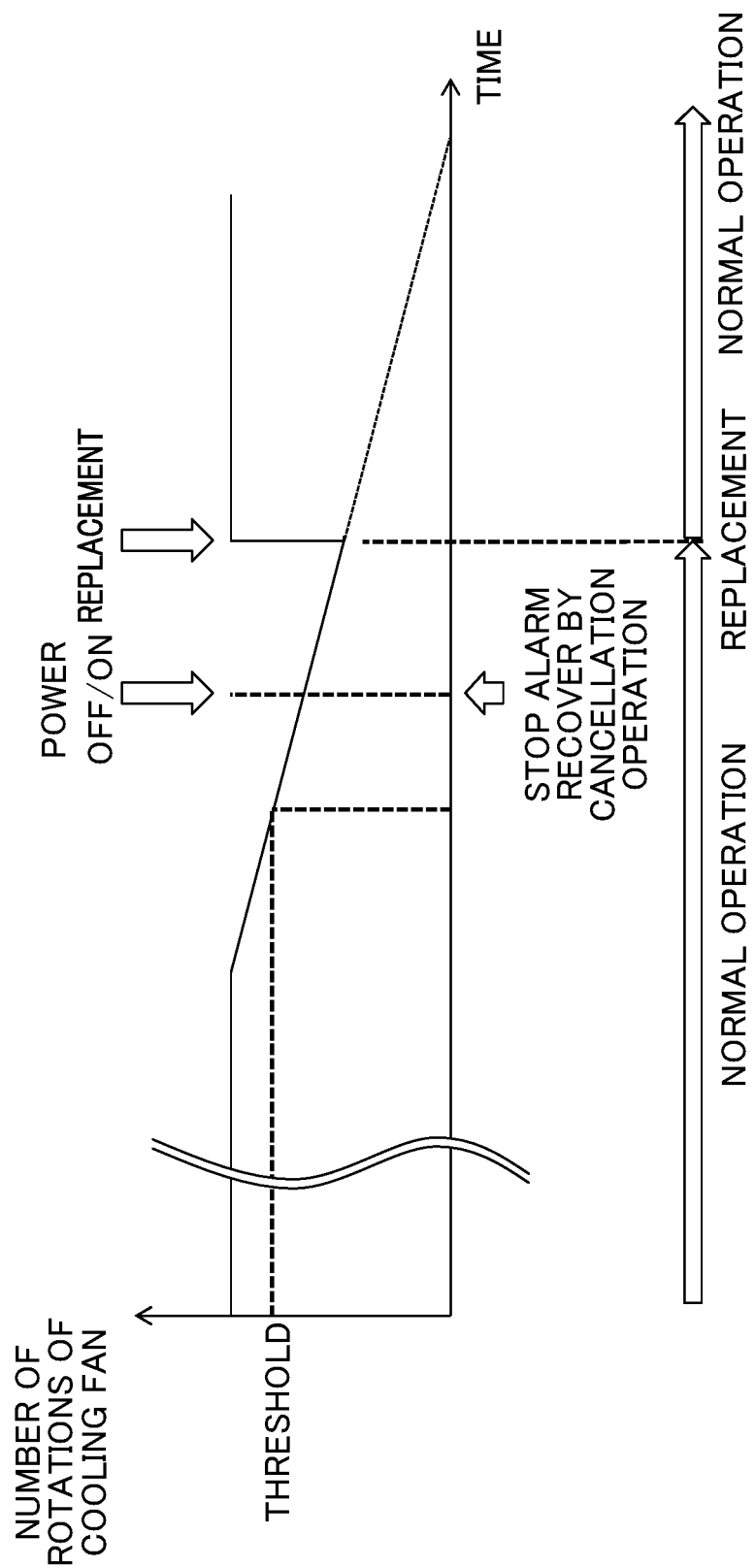
FIG. 4 is a chart schematically showing a relationship between numerical information and a threshold value in the control apparatus according to the first embodiment.

As shown in FIG. 4, when the industrial machine 100 is powered on, the deterioration diagnostic unit 12 compares the threshold value and the number of rotations per unit time of the fan of the industrial machine 100 during the operation. As a result of comparison, the deterioration diagnostic unit 12 outputs the contents of detection to the display unit 15 when detecting a decrease in the number of rotations per unit time exceeding the threshold value.

The alarm control unit 14 brings the industrial machine 100 into the alarm stop state. The alarm control unit 14 returns the industrial machine 100 to the operable state based on reception of the cancellation operation. A fan abnormality is reliably recognized, and at a later date, the fan is replaced at such time that maintenance of the industrial machine 100 can be performed, for example. Thus, the industrial machine 100 is maintained in a normal operation state without a decrease in an operation rate.

(Battery Voltage)

Figure 5:
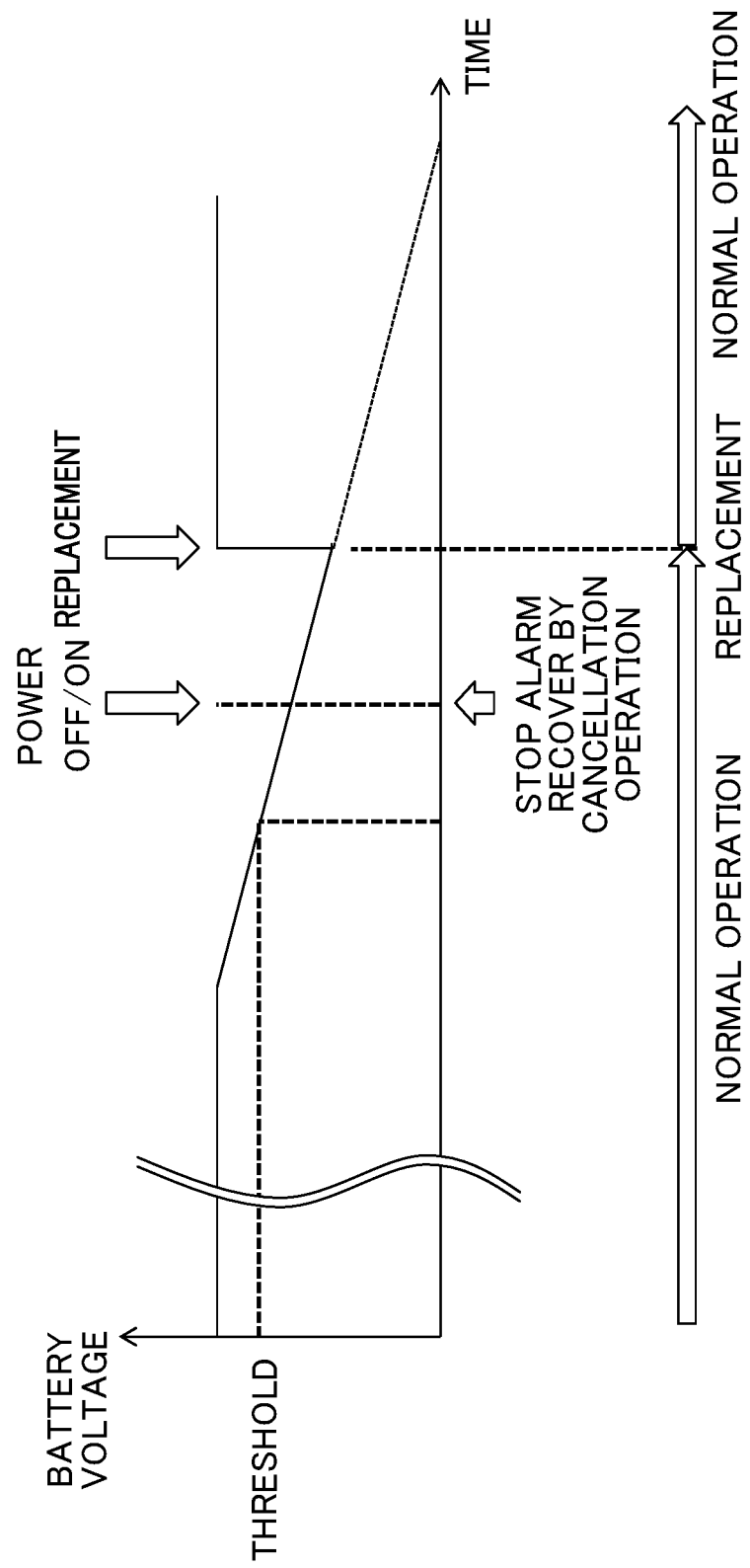
FIG. 5 is a chart schematically showing the relationship between the numerical information and the threshold in the control apparatus according to the first embodiment.

As shown in FIG. 5, when the industrial machine 100 is powered on, the deterioration diagnostic unit 12 compares the threshold value and the battery voltage of the industrial machine 100 during the operation. As a result of comparison, the deterioration diagnostic unit 12 outputs the contents of detection to the display unit 15 when detecting a decrease in the battery voltage exceeding the threshold value.

The alarm control unit 14 brings the industrial machine 100 into the alarm stop state. The alarm control unit 14 returns the industrial machine 100 to the operable state based on reception of the cancellation operation. Battery consumption is reliably recognized, and at a later date, the battery is replaced at such time that maintenance of the industrial machine 100 can be performed, for example. Thus, the industrial machine 100 is maintained in the normal operation state without a decrease in the operation rate.

(Insulating Component)

Figure 6:
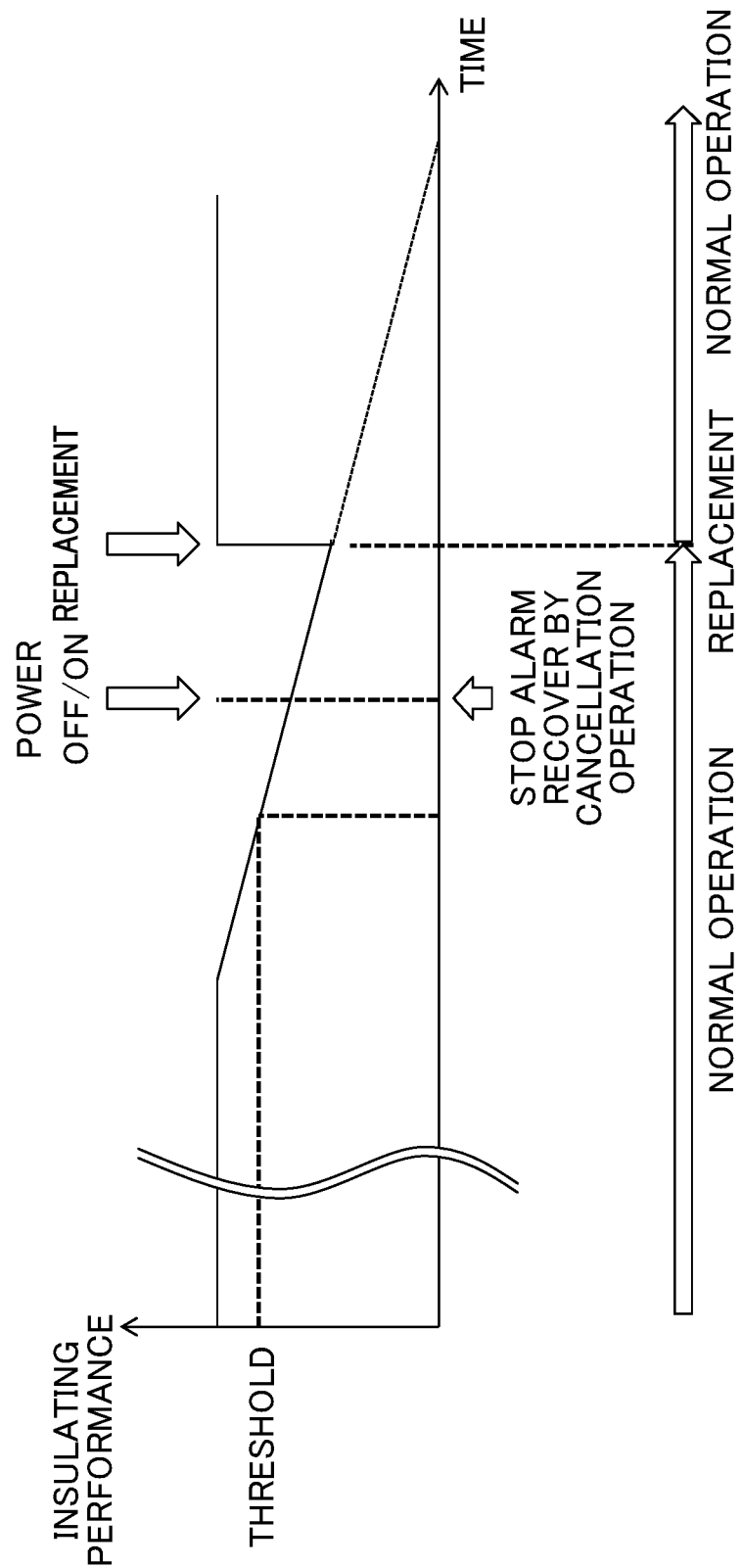
FIG. 6 is a chart schematically showing the relationship between the numerical information and the threshold value in the control apparatus according to the first embodiment.

As shown in FIG. 6, when the industrial machine 100 is powered on, the deterioration diagnostic unit 12 compares the threshold value and the insulating performance of the insulating component of the industrial machine 100 during the operation. As a result of comparison, the deterioration diagnostic unit 12 outputs a detection result to the display unit 15 when detecting decline of the insulating performance exceeding the threshold value.

The alarm control unit 14 brings the industrial machine 100 into the alarm stop state. The alarm control unit 14 returns the industrial machine 100 to the operable state based on reception of the cancellation operation. An insulating component abnormality is reliably recognized, and at later date, abnormality examination and replacement of the insulating component are performed at such time that maintenance of the industrial machine 100 can be performed, for example. Thus, the industrial machine 100 is maintained in the normal operation state without a decrease in the operation rate. The insulating component described herein includes functional components having an insulating function, such as a servo motor that operates the industrial machine 100, a power cable that supplies power to a servo motor, and a servo amplifier that generates power for a servo motor.

According to the control apparatus 1 and the program of the first embodiment as described above, the following advantageous effects are provided.

(1) The control apparatus 1 for controlling the industrial machine 100 includes the deterioration diagnostic unit 12 that has the diagnostic function, which is repeatedly executed at the predetermined timing, for diagnosing deterioration of each component 101 of the industrial machine 100 and outputs the alarm signal in response to deterioration equal to or more than a predetermined level in each component 101, the alarm control unit 14 that outputs the stop command to the industrial machine 100 based on the alarm signal and informs that the industrial machine 100 is in the alarm stop state, and the cancellation operation receiving unit 16 that receives the cancellation operation for cancelling the alarm stop state. The deterioration diagnostic unit 12 cancels the alarm stop state brought on by the diagnostic function based on the cancellation operation, and allows the industrial machine 100 to operate the diagnostic function is executed next. In a case where there is the deterioration equal to or more than a predetermined level at the predetermined the industrial machine 100 is brought on into the alarm stop state. Thus, deterioration of the component 101 can be more clearly shown to the operator. On the other hand, the alarm stop state can be cancelled using the preset cancellation operation. This can avoid the production line 200 from stopping operation due to the alarm stop state or the industrial machine 100. Thus, while the industrial machine 100 can be continuously operating, the necessity of replacing the deteriorated component can be more clearly shown to the operator.

(2) The deterioration diagnostic unit 12 includes the numerical information acquisition unit 122 that acquires the operation state of each component 101 as the numerical information, the threshold acquisition unit 121 that acquires, for the numerical information on each component 101, the threshold value indicating deterioration, and the determination unit 123 that determines deterioration of each component 101 based on the numerical information and the threshold value. With this configuration, deterioration of the industrial machine 100 can be easily determined.

(3) The deterioration diagnostic unit 12 executes the diagnostic function at the timing of powering on the industrial machine 100. With this configuration, the deteriorated state can be inspected during a preparation stage before the operation of the industrial machine 100, such as during warm-up operation of the industrial machine 100 or during inspection before start. Thus, the diagnostic function can be executed at such time that the operator can more easily recognize the deteriorated state. It is intended to cause the operator to reliably recognize the deteriorated state of each component 101. The cancellation operation is necessary for bringing the industrial machine 100 into the operable state, and therefore, is performed so that the operator can recognize the deteriorated state of each component 101. A reason why the diagnostic function is performed at the timing of powering on the industrial machine 100 is that a burden on the operator can be reduced and a decrease in the operation rate of the industrial machine 100 can be avoided because the diagnostic function is performed in a situation where the operator can reliably recognize the alarm stop state of the industrial machine 100 and can perform the alarm cancellation operation and a situation where the operator has time to spare, such as during the warm-up operation of the industrial machine 100 or inspection before the start.

Second Embodiment

Figure 7:
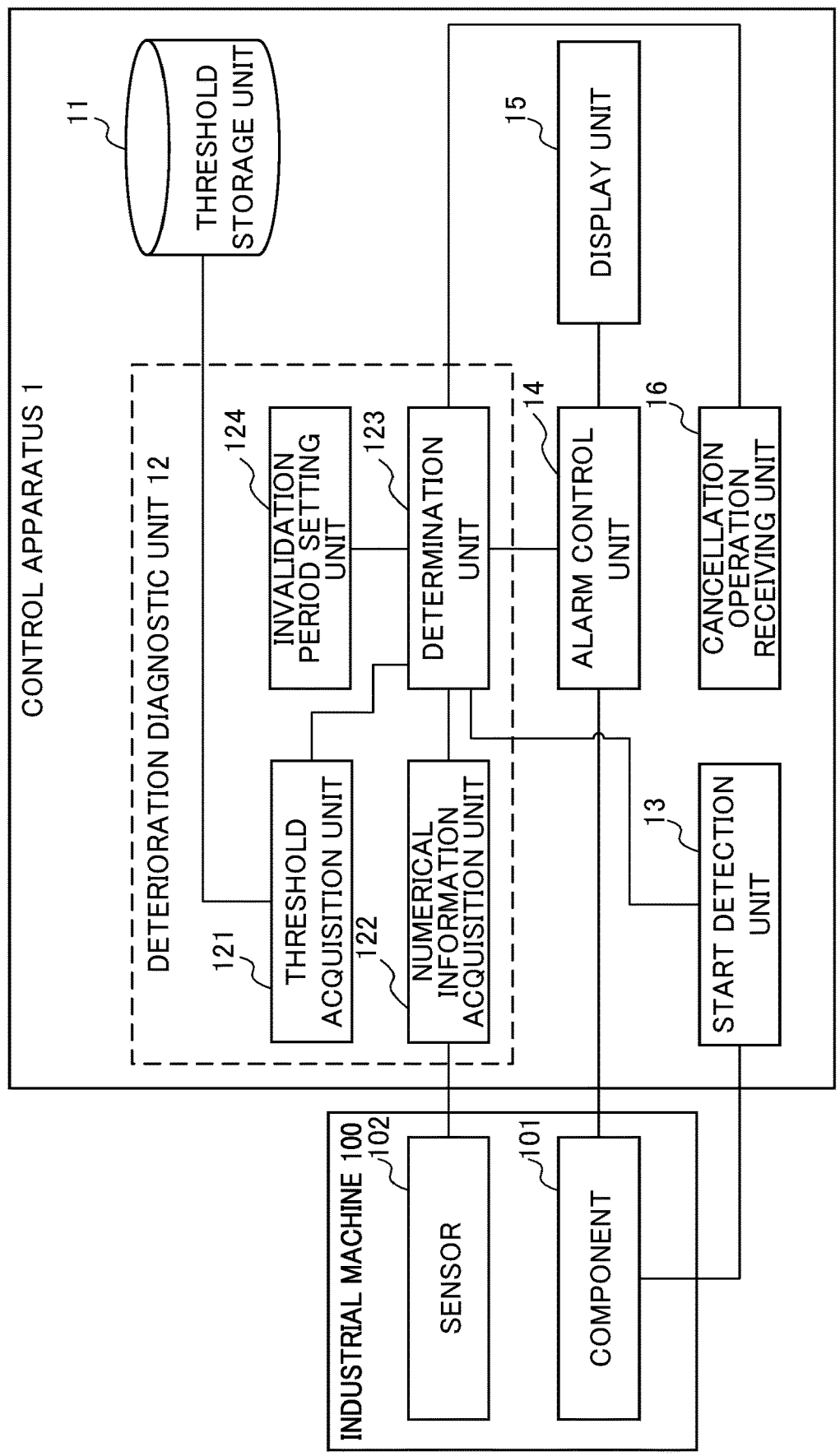
FIG. 7 is a block diagram showing a control apparatus according to a second embodiment of the present disclosure.
Figure 8:
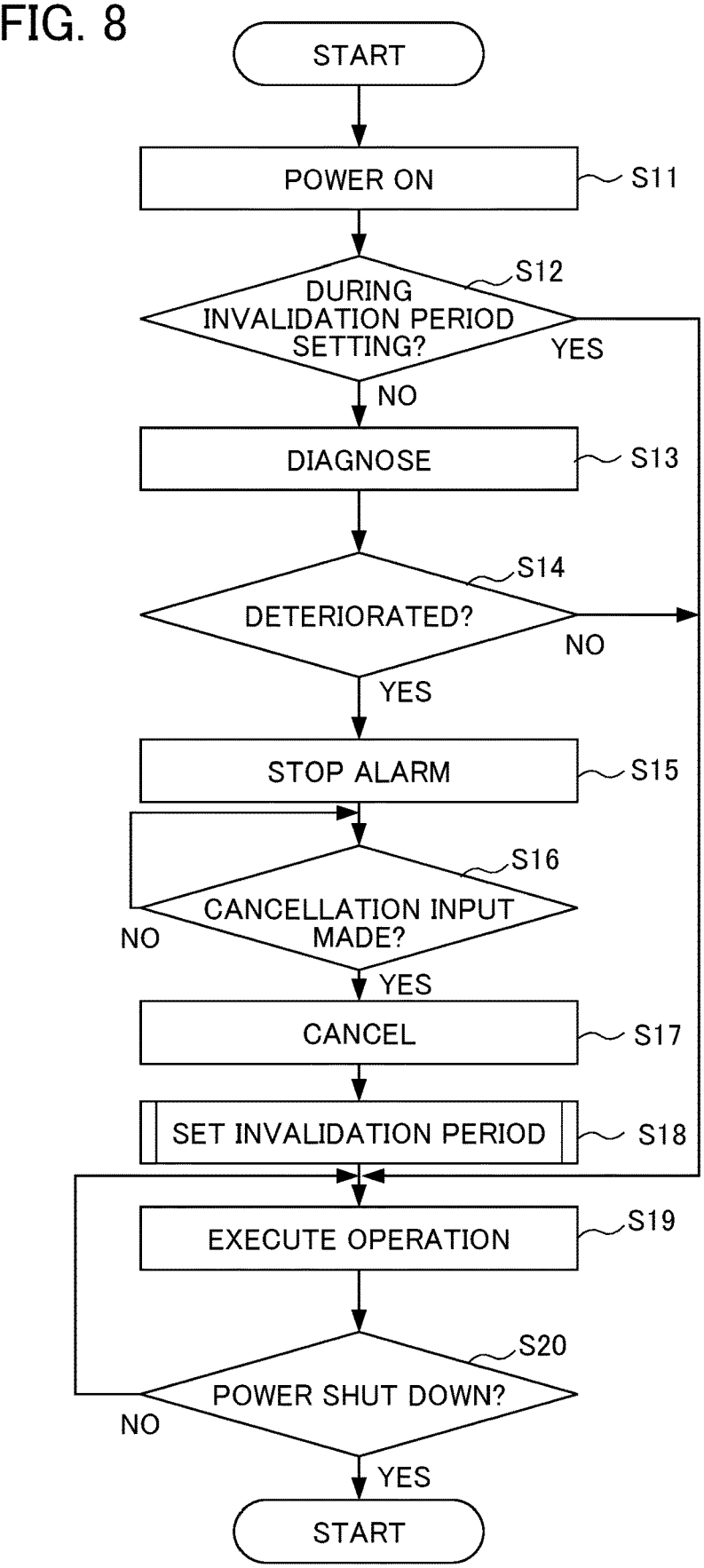
FIG. 8 is a flowchart showing operation of the control apparatus of the second embodiment.
Figure 9:
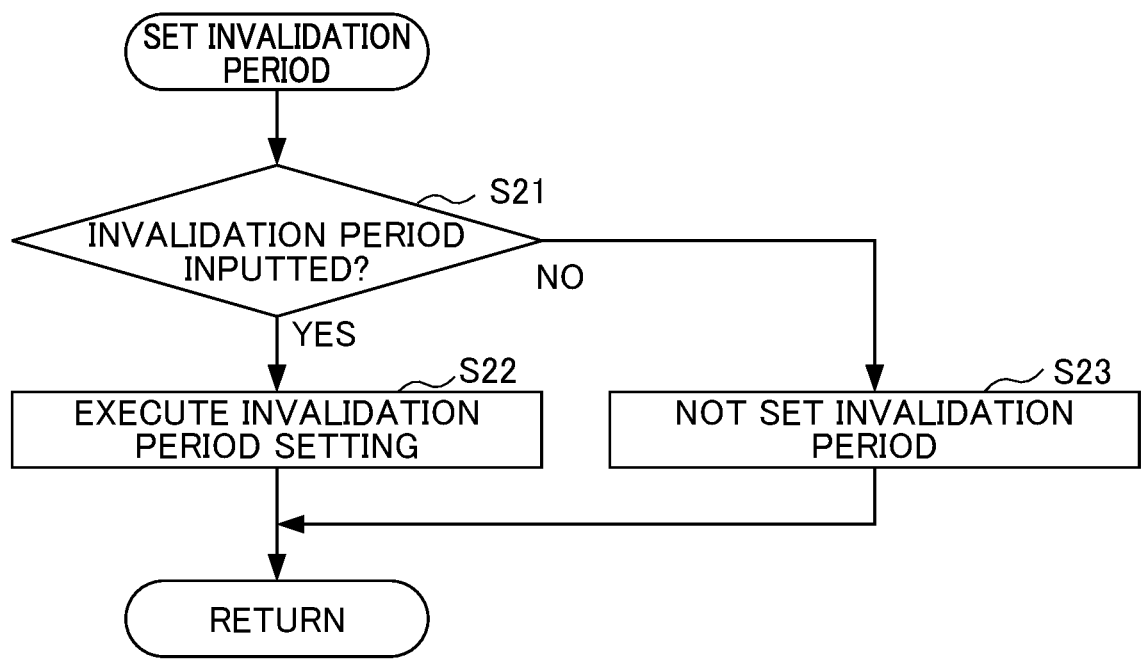
FIG. 9 is a flowchart showing the operation of the control apparatus of the second embodiment.

Next, a control apparatus 1 and a program according to a second embodiment of the present disclosure will be described with reference to FIGS. 7 to 9. In the description of the second embodiment, the same reference numerals are used to represent the same components as those of the above-described embodiment, and the description thereof will be omitted or simplified. The control apparatus 1 and the program according to the second embodiment are different from those of the first embodiment in that execution of diagnosis of an industrial machine 100 by a deterioration diagnostic unit 12 can be invalidated for a set period. Accordingly, the control apparatus 1 and the program according to the second embodiment are different from those of the first embodiment in that the deterioration diagnostic unit 12 further includes an invalidation period setting unit 124 as shown in FIG. 7.

The invalidation period setting unit 124 is, for example, implemented by operation of a CPU. The invalidation period setting unit 124 sets an invalidation period for invalidating execution of a diagnostic function. That is, the invalidation period setting unit 124 sets the invalidation period for invalidating execution of the diagnostic function by the deterioration diagnostic unit 12. The invalidation period setting unit 124 sets the invalidation period for invalidating the diagnostic function based on the input of the invalidation period from the outside. In a case where maintenance of the industrial machine 100 is performed (replacement of a component 101 is performed) on the weekend, the invalidation period setting unit 124 sets the invalidation period as an "operation day" in, e.g., a non-volatile memory in advance, for example. In a case where cancellation operation is performed in a state in which the invalidation period has been set, the invalidation period setting unit 124 does not perform the subsequent diagnostic function on the "operation day". After replacement of the component 101 on a "holiday", power is turned on, and in this manner, the diagnostic function is performed again and the invalidation period ends. Thereafter, when powered on, the diagnostic function by the deterioration diagnostic unit 12 is performed.

Next, the control apparatus 1 and the program according to the present embodiment will be described with reference to flowcharts of FIGS. 8 and 9. First, the industrial machine 100 is powered on (Step S11). Subsequently, the deterioration diagnostic unit 12 determines the presence or absence of the diagnosis based on the invalidation period set by the invalidation period setting unit 124 (Step S12). That is, the deterioration diagnostic unit 12 determines whether or not it is within the set invalidation period. In a case where the diagnosis is executed (Step S12: NO), the process proceeds to Step S13. On the other hand, in a case where the diagnosis is not executed (Step S12: YES), the process proceeds to Step S18.

At Step S13, the deterioration diagnostic unit 12 executes the diagnosis of the industrial machine 100. Subsequently, the deterioration diagnostic unit 12 determines deterioration of the component 101 (Step S14). In a case where the component 101 is diagnosed as being in a deteriorated state (Step S14: YES), the process proceeds to Step S15. On the other hand, in a case where the component 101 is determined as not being in the deteriorated state (Step S14: NO), the process proceeds to Step S18.

At Step S15, an alarm control unit 14 brings the industrial machine 100 into an alarm stop (trip) state. Moreover, the alarm control unit 14 outputs, to a display unit 15, a signal indicating the component 101 in the deteriorated state. The display unit 15 executes display based on the outputted signal.

Subsequently, at Step S16, the deterioration diagnostic unit 12 determines the presence or absence of reception of preset cancellation operation for cancelling the alarm stop state. For example, for the cancellation operation received by a cancellation operation receiving unit 16, the deterioration diagnostic unit 12 determines whether or not the cancellation operation matches with a preset cancellation code. In this manner, the deterioration diagnostic unit 12 determines the presence or absence of reception of the preset cancellation operation. In a case where the preset cancellation operation has been received (Step S16: YES), the process proceeds to Step S17. On the other hand, in a case where the preset cancellation operation has not been received (Step S16: NO), the process repeats Step S16.

At Step S17, the deterioration diagnostic unit 12 cancels alarm stop of the industrial machine 100. That is, the deterioration diagnostic unit 12 changes the industrial machine 100 to an operable state.

Subsequently, the process for setting the invalidation period by the invalidation period setting unit 124 is executed (Step S18). The invalidation. period setting process will be described later.

Subsequently, operation of the industrial machine 100 is executed (Step S19). Subsequently, shutdown of the power of the industrial machine 100 is determined (Step S20). In a case where the power of the industrial machine 100 is shut down (Step S20: YES), the process according to the present flow ends. On the other hand, in a case where the power of the industrial machine 100 is not shut down (Step S20: NO), the process returns to Step S19, and the operation of the industrial machine 100 is continued.

Next, the invalidation period setting process will be described with reference to FIG. 9. At Step S21, the invalidation period setting unit 124 determines whether or not the input of the invalidation period has been received. In a case where the invalidation period has been inputted (Step S21: YES), the invalidation period setting unit 124 sets the input period as the invalidation period (Step S22). On the other hand, in a case where the invalidation period has not been inputted (Step S21: NO), the invalidation period setting unit 124 does not set the invalidation period (Step S19. Thereafter, the process proceeds to Step S19.

According to the control apparatus 1 and the program of the second embodiment as described above, the following advantageous effects are provided.

(4) The deterioration (agnostic unit 12 furthers the invalidation. period setting unit 124 that sets the invalidation period for invalidating execution of the diagnostic function, and after the cancellation operation, the alarm control unit 14 invalidates the diagnostic function during the set invalidation period. With this configuration, case where the alarm stop state of the industrial machine 100 needs to be avoided, such as a period in which replacement cannot be performed, the alarm stop state of the industrial machine 100 can be avoided. Thus, convenience can be more improved.

Each of the preferred embodiments of the control apparatus and the program of the present disclosure has been described above. However, the present disclosure is not limited to the above-described embodiments, and can be changed as necessary.

For example, in the above-described embodiments, the control apparatus 1 and the program according to the first embodiment and the second embodiment may be implemented in combination as necessary. The control apparatus 1 and the program of the first embodiment and the second embodiment may be all combined, for example.

Moreover, in the above-described embodiments the alarm control unit 14 brings the industrial machine 100 into the alarm stop state in the power-on. However, the present disclosure is not limited to such a configuration. For example, the alarm control unit 14 may bring the industrial machine 100 into the alarm stop state at the timing of shutting down the power of the industrial machine 100. The industrial machine 100 is in the alarm stop state when powered on, and therefore, deterioration of the component 101 can be notified to the operator.

Further, in the above-described embodiments, the display unit 15 has been described as one example of an output destination of the alarm signal. However, the present disclosure is not limited to such a configuration. The display unit 15 and an audio reproduction unit (not shown) may be included as an output unit, for example. In a case where the operator is away from the industrial machine, the alarm signal output destination may receive alarm information from, a mobile terminal or a mobile phone having, a wireless function, and the cancellation operation may be performed by operation of such a terminal.

In addition, in the above-described second embodiment, the invalidation period setting unit 124 sets the invalidation period after cancellation of the alarm stop state of the industrial machine 100. However, it may be configured such that the setting is stored in advance in the non-volatile memory, and in a case where the invalidation period has been set, the diagnostic function is not performed during such a period.

EXPLANATION OF REFERENCE NUMERALS

1 Control Apparatus
12 Deterioration Diagnostic Unit
14 Alarm Control Unit
16 Cancellation Operation Receiving Unit
100 Industrial Machine
101 Component
121 Threshold Acquisition Unit
122 Numerical Information Acquisition Unit
123 Determination Unit
124 Invalidation Period Setting Unit

What is claimed is:

1. A control apparatus for controlling an industrial machine, comprising a processor, the processor being configured to:

execute a diagnostic function for diagnosing deterioration of each component of the industrial machine and output an alarm signal in response to deterioration equal to or more than a predetermined level in each component, the diagnostic function being repeatedly executed at predetermined timing;

output a stop command to the industrial machine based on the alarm signal and informs that the industrial machine is in an alarm stop state, in which the industrial machine is stopped;

and receive cancellation operation for cancelling the alarm stop state and restart the industrial machine, wherein the processor cancels the alarm stop state brought on by the diagnostic function based on the cancellation operation, and continues operation of the industrial machine until a next execution of the diagnostic function that is executed at a next timing of the predetermined timing.

2. The control apparatus according to claim 1, wherein the processor sets an invalidation period for invalidating execution of the diagnostic function, and after the cancellation operation, invalidates the diagnostic function and continues the operation of the industrial machine during the set invalidation period.

3. The control apparatus according to claim 1, wherein the processor executes the diagnostic function each time the industrial machine is powered on.

4. The control apparatus according to claim 1, wherein the processor acquires an operation state of each component as numerical information, acquires, for the numerical information on each component, a threshold value indicating deterioration, and determines deterioration of each component based on the numerical information and the threshold value.

5. The control apparatus according to claim 1, wherein the processor cancels the alarm stop state when it is identified that the received cancellation operation matches a preset cancellation code.

6. A non-transitory program recording medium causing a computer to function as a control apparatus having an automatic diagnostic function for an industrial machine, wherein the program causes a computer to function as a deterioration diagnostic unit that executes a diagnostic function, which is repeatedly executed at predetermined timing, for diagnosing deterioration of each component of the industrial machine and outputs an alarm signal in response to deterioration equal to or more than a predetermined level in each component, an alarm control unit that outputs a stop command to the industrial machine based on the alarm signal and informs that the industrial machine is in an alarm stop state, in which the industrial machine is stopped, a cancellation execution unit that executes cancellation based on cancellation operation for cancelling the alarm stop state and restarts the industrial machine, and the deterioration diagnostic unit cancels the alarm stop state brought on by the diagnostic function based on the cancellation operation, and continues operation of the industrial machine until a next execution of the diagnostic function that is executed at a next timing of the predetermined timing.

7. The non-transitory program recording medium according to claim 6, wherein the deterioration diagnostic unit cancels the alarm stop state when it is identified that the received cancellation operation matches a preset cancellation code.

\* \* \* \* \*